Feb. 17, 1970    H. A. V. JOHANSSON    3,495,639
FOOD CUTTING DEVICE
Filed June 5, 1967    2 Sheets-Sheet 1

INVENTOR
Hans Arne
Vallentin JOHANSSON

INVENTOR
Hans Arne
Vallentin JOHANSSON

United States Patent Office 3,495,639
Patented Feb. 17, 1970

---

3,495,639
FOOD CUTTING DEVICE
Hans Arne Vallentin Johansson, Treharadsvagen 36,
Eslov, Sweden
Filed June 5, 1967, Ser. No. 643,724
Int. Cl. A01f 3/00; B26b 3/04, 13/02
U.S. Cl. 146—78     8 Claims

ABSTRACT OF THE DISCLOSURE

A device for cutting vegetables into slices, strips, or cubes comprising a pair of flat, longitudinally spaced plates, one plate having a cutting edge and also having a plurality of vertically disposed, horizontally spaced knives, the other plate being vertically adjustable relative to said one plate to vary the slice thickness.

---

Figure 2:
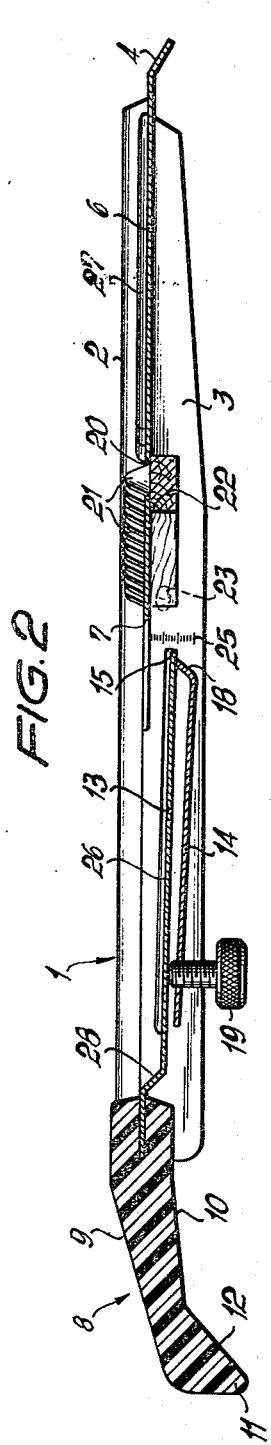

The present invention generally relates to an improved food cutting device, more particularly of the type comprising an array of vertically extending spaced-parallel knives and a horizontally lying knife for cutting pieces of food into slices, strips or cubes by moving the object to be cut, when supported on the top face of the device, over or against the knives, respectively.

Many of the prior-art constructions of this kind, because of their complicated structure, are too costly to warrant their domestic usage. On the other hand, such relatively simple implements which do exist are intended to be placed on a flat supporting surface onto which they have to be secured or clamped to perform cutting work. The food slices etc. severed, as a consequence, will drop onto the rigid supporting surface. Further, any knife adjustments, or removal of the knives for grinding or cleaning, for example, require extensive disassembly and re-assembly work. A further essential drawback resides in that, to enable the knives to be replaced, these prior-art devices are constituted by a plurality of parts interconnected by screws and between which food remnants, crumbs and impurities may gather. For effective cleaning, therefore, the cutting device will have to be completely disassembled into separate parts, each of which must be cleaned individually.

The present invention has for its object to eliminate these drawbacks, and this is attained by an improvement which resides in that the cutting device comprises two substantially flat plates arranged at different levels within an elongated frame and in positions which are relatively displaced in the longitudinal direction of the frame, the lower plate being adjustable into different angular positions relative to the upper plate, and the upper plate being equipped with an array of spaced knives projecting upwardly from the top face of said plate and extending in parallel relation to the longitudinal axis of the frame. To enable convenient adjustment of the lower plate relative to the upper plate, the former plate may be made of resilient material and may be connected to the frame at its end remote from the upper plate only, in which case the frame may be provided with a vertically adjustable support for the lower plate, and this support may comprise an adjustment screw engaging this plate. The vertical knives may be mounted on a bar releasably secured to the frame or to the bottom face of the upper plate, and the upper plate may be provided with slots for passing the vertically projecting knives therethrough. A handle may be attached to the end of the frame carrying the lower plate, and the plates may be provided with sets of spaced ribs extending in parallel relation to the longitudinal axis of the frame.

The cutting device of the present invention is a simple hand tool adapted to perform the cutting work by being held by one hand directly above the place where the cuttings are to be disposed. Thus, the cut-off pieces need not be moved which means saving in time and enables a more hygienic handling than before. This is of importance, especially where it is desired to dispose several parts of one single piece of food at several places, such as slices of cheese onto some sandwiches.

The vertical knives are removable by a simple manipulation which saves time and reduces the risk of cutting injuries. In addition, the cutting device of the present invention can easily be kept clean, because it is composed of a small number of parts which are all readily accessible for cleaning purposes.

Figure 1:
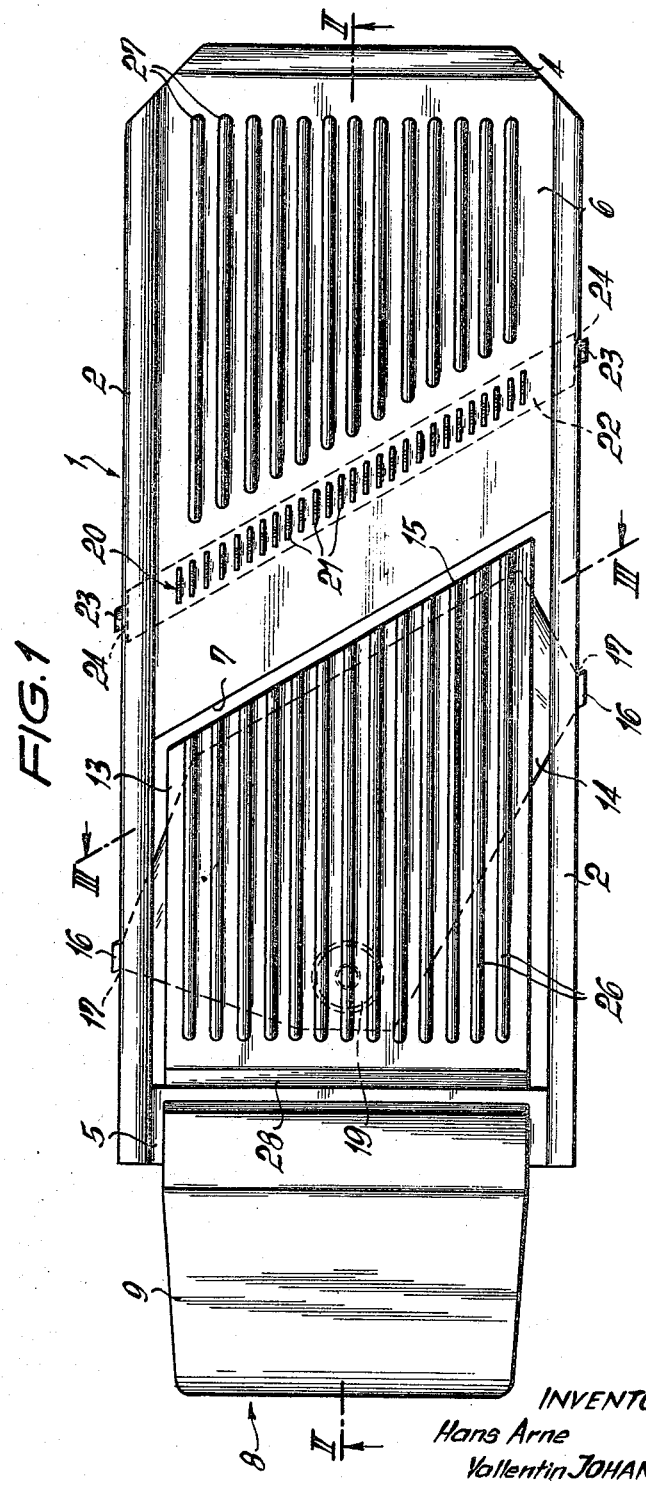
Figure 3:
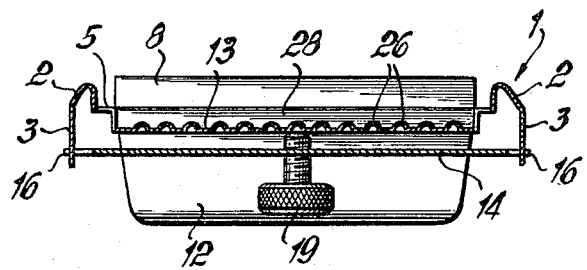

Further features and advantages of the invention will be apparent from the following description, reference being had to the accompanying drawings illustrating one specific embodiment thereof by way of example, and in which:

FIGURE 1 is a top-plan view of the cutting device;
FIGURE 2 is a longitudinal section taken on line II—II in FIGURE 1; and
FIGURE 3 is a cross section taken on line III—III in FIGURE 1.

Referring to the drawings more specifically, numeral 1 designates an elongated frame, made of stainless steel, for example, numeral 2 are its longitudinal side members being substantially U-shaped in cross section for increased rigidity of the frame and having their extended, depending legs 3 resilient to enable the same to spring back into their initial positions after having been subjected to outward deflection, numeral 4 designates one end member of the frame 1, this end member being bent off downwardly to impart increased rigidity to the frame, as well as to guide a piece of food to be severed when the latter has been moved to far beyond this end of the frame, numeral 5 designates the other end member of frame 1, and numeral 6 designates an upper plate disposed between the side members 2 and having a sharp-ground cutting edge 7 extending at an angle to the longitudinal axis of the frame 1. The end member 5 of the frame 1 is provided with a handle 8 which, in order to give a suitable grip for the hand, is tapered outwardly and slightly inclined downward so that its top surface 9 will give support for the fingers, while its bottom surface 10 is formed at its extreme end with a depending callosity 11 serving as a support for the palm and having a front surface 12 which is inclined relative to the frame 1 and serves as a support for the thumb. Mounted on the end member 5 and handle 8 of the frame 1 is a lower plate 13 which is disposed between the side members 2 of the frame 1 and is adjustable in height, this plate being made of a resilient material. This plate is formed adjacent its attachment end with a depending offset 28, and its free end edge 15 is slightly spaced from the cutting edge 7 of the upper plate 6 and extends in parallel relation thereto. Disposed beneath the lower plate 13 and between the two side members 2 of the frame is a supporting plate 14 extending in spaced-parallel relation to the plane of the lower plate and being angularly adjustable between two limit positions, this supporting plate having laterally projecting lugs 16 engaged with a certain clearance in apertures 17 formed in the side members 2, respectively, of the frame. For cleaning or replacement purposes, the supporting plate 15 may be conveniently released from the side members 2 of the frame by flexing the legs 3 outward thereby releasing the lugs 16 of the supporting plate. The supporting plate is provided adjacent the free end edge 15 of the lower plate 13 with an abutment in the form of an edge portion 18 directed towards the lower plate 13. This edge portion extends in spaced-parallel relation to the pivot axis of the supporting plate 14 and to the free end edge 15 of the lower plate. To adjust the lower plate 13 vertically relative to the upper plate 6, an adjustment screw 19 is threaded through the portion of the supporting plate 14 remote from its abutment edge 18 and is so disposed that its head is beneath the supporting plate and the extreme end of its threaded shaft engages the bottom face of the lower plate 13.

The upper plate 6 is formed in spaced relation to its free end or cutting edge 7 with a plurality of slots 20 extending in parallel relation to longitudinal axis of the frame 1 and disposed in a row parallel to said cutting edge 7. Received in these slots 20 are vertical knives 21, respectively, passing therethrough and projecting to a certain height above the upper plate 6, these knives being mounted on a bar 22 which is secured to the bottom face of the upper plate 6 or engaged in the side members 2 of the frame 1 by means of studs 23 projecting from the extreme ends of the bar 22 and engaged in corresponding openings 24 in the side members 2, respectively, of the frame. The bar 22 carrying the knives 21 is replaceable by flexing the legs 3 of the side members 2 outwardly thereby releasing said studs.

The inside surface of the frame is provided in the region adjacent the free end edge 15 of the lower plate 13 with an adjustment scale 25 for enabling accurate setting of the thickness of the slices to be cut. The top faces of the upper and lower plates 6, 13 are provided with sets of spaced-parallel longitudinal ribs 26, 27 for reinforcing purposes and for guiding the object to be cut. To enable the object to be cut to engage the cutting device continuously during the cutting operation, the upper plate 6 between the array of vertical knives 21 and the depending end member 4 has a length substantially equal to that of the lower plate 13.

In operation, to cut a piece of food into slices, the lower plate 13 is set to any desired position relative to the upper plate 6. The bar 22 carrying the set of vertical knives 21 is removed, and the object to be cut is placed onto the lower plate 13 and is then moved against the sharpened edge 7 of the upper plate 6, thereby cutting slices. To cut strips, a bar 22 carrying any desired number of knives 21 of a certain height is mounted in place, and the lower plate 13 is so adjusted for cutting that the vertical clearance between its free end edge 15 and the cutting edge 7 is less than the height of the knives 21 above the upper plate 6. The object to be cut is placed on the upper plate 6 between the vertical knives 21 and the end member 4 of the frame 1 and is then advanced in engagement with the vertical knives, causing the latter to slit up the bottom portion of the piece of food, such as a loaf of bread, into a plurality of strips remaining fixed to be cut free when, after having been displaced onto the lower plate 13, the object being cut is moved in the opposite direction against the cutting edge 7, while at the same time the bottom portion of the object being cut is again slit up into strips by the vertical knives 21.

To cut a piece of food into cubes, the cutting device is set up in the similar way as described for producing strips. The object to be cut is placed upon the portion of the upper plate 6 disposed between the set of vertical knives 21 and the cutting edge 7 and is moved in engagement with the knives so that fixed strips are formed. On the portion of the upper plate 6 disposed between the set of knives 21 and the end member 4 of the frame 1, the object being cut is turned 90° about a vertical axis and is again moved over the vertical knives 21 onto the lower plate 13, after which the object being cut is moved against the cutting edge 7 thereby severing the cubes.

The cutting device is held in place by one hand and may be moved conveniently from one place to another while carrying out the cutting work, the object being cut being held by the other hand. If the work is heavy or long-lasting, it is possible to support the depending end member 4 of the frame 1 on a table top or on the edge of a pan, for example.

I claim:
1. In a food cutting device comprising two substantially flat plates arranged at different levels within an elongated frame in positions which are relatively displaced in the longitudinal direction of the frame, the end of the upper plate adjacent to the lower plate being shaped as a cutting edge and the lower plate being (a) connected to the frame at the end remote from the upper plate only, and (b) made of a resilient material, and (c) engaged with a vertically movable support so as to be adjustable to different angular positions relative to the upper plate, the improvement in which the upper plate is equipped with an array of knives in spaced relation to the ends of the upper plate, projecting upwardly from the top face of the plate and extending in parallel relation to the longitudinal axis of the frame.

2. In a food cutting device according to claim 1, the improvement in which there is disposed beneath the lower plate a supporting plate which is angularly adjustable between two limit positions about a transverse axis parallel to the plane of said lower plate, said supporting plate at its end portion remote from the upper plate having engaged therewith adjustment means engaging said lower plate and being provided at the opposite side of its pivot axis with a support for the lower plate.

3. In a food cutting device according to claim 2, the improvement in which said support is formed by an upwardly bent edge portion of the supporting plate.

4. A food cutting device according to claim 2, characterized in that said axis parallel to the lower plate extends at an oblique angle to the longitudinal axis of the frame, and in that this axis, said support, and the free end ledges of the lower plate and of the upper plate extend in parallel relation to each other.

5. A food cutting device according to claim 4, characterized in that said supporting plate is provided or formed with laterally projecting lugs engaging with clearance corresponding openings formed in the side members of the frame.

6. A food cutting device according to claim 1, characterized in that said knives are carried by a bar removably secured to the frame or to the bottom face of the upper plate, and in that said plate is formed with slots for receiving the knives.

7. A food cutting device according to claim 6, characterized in that the side members of the frame are resilient and formed with openings in which studs at the extreme ends of said bar are insertable.

8. A food cutting device according to claim 1, characterized in that said upper and lower plates are provided with sets of spaced-parallel ribs extending in the longitudinal direction of the frame.

References Cited

UNITED STATES PATENTS

| 852,844 | 5/1907 | Ono | 146—171 |
| 2,089,258 | 8/1937 | Hamad | 146—171 X |
| 2,258,087 | 10/1941 | Deiss | 146—180 |
| 2,508,320 | 5/1950 | Wheelwright | 146—171 |
| 3,033,255 | 5/1962 | Pitavy | 146—169 |

FOREIGN PATENTS 243,062  11/1946  Switzerland.

W. GRAYDON ABERCROMBIE, Primary Examiner

U.S. Cl. X.R.

146—171